United States Patent [19]
Hult et al.

[11] Patent Number: 6,002,828
[45] Date of Patent: Dec. 14, 1999

[54] POLYMER OPTICAL GUIDE MADE FROM A MONOMER WITH AT LEAST ONE EPOXY GROUP AND A VINYL TYPE MONOMER

[75] Inventors: Anders Hult, Täby; Claire Pitois, Sundbyberg; Mats Robertsson, Stockholm, all of Sweden

[73] Assignee: Telefonaktiebolaget LM Ericsson, Stockholm, Sweden

[21] Appl. No.: 08/951,337

[22] Filed: Oct. 17, 1997

[30] Foreign Application Priority Data

Oct. 18, 1996 [SE] Sweden ................................. 9603842

[51] Int. Cl.$^6$ ........................................................ G02B 6/10
[52] U.S. Cl. ............................................. 385/141; 385/143
[58] Field of Search ..................................... 385/141–145

[56] References Cited

U.S. PATENT DOCUMENTS

| | | | |
|---|---|---|---|
| 4,919,514 | 4/1990 | Ebert et al. | 350/96.34 |
| 5,343,544 | 8/1994 | Boyd et al. | 385/46 |
| 5,406,641 | 4/1995 | Bigley, Jr. et al. | 385/141 |
| 5,485,541 | 1/1996 | Bigley, Jr. et al. | 385/141 |

FOREIGN PATENT DOCUMENTS

| | | | |
|---|---|---|---|
| 0 446 672 | 9/1991 | European Pat. Off. | 385/129 |
| 0 687 925 | 12/1995 | European Pat. Off. | 385/129 |
| 1-046706 | 2/1986 | Japan . | |
| 61-034503 | 2/1997 | Japan | 385/141 |
| 61-34503 | 2/1997 | Japan | 385/141 |

OTHER PUBLICATIONS

Allan F.M. Barton, Ph.D., *CRC Handbook of Solubility Parameters and Other Cohesion Parameters*, 2$^{nd}$ Edition, (Table of Contents) (1992).

Lawrence A. Hornak, *Polymers of Lightwave and Integrated Optics, Technology and Applications*, Hilmar Franke, Ch. 8: "Polyimide Lightguides," pp. 207–230 (1992).

Lawrence A. Hornak, *Polymers of Lightwave and Integrated Optics, Technology and Applications*, B.L. Booth, Ch. 9, "Optical Interconnection Polymers," pp. 231–266 (1992).

Lawrence A. Hornak, *Polymers of Lightwave and Integrated Optics, Technology and Applications*, Davis H. Hartman, Ch. 10: "Polymer Optics in the Information Age," pp. 267–286 (1992).

*Primary Examiner*—John D. Lee
*Assistant Examiner*—Victoria D. Hao
*Attorney, Agent, or Firm*—Burns, Doane, Swecker & Mathis, L.L.P.

[57] ABSTRACT

The present invention relates to a device for guiding light, made from a polymer material comprising different monomers arranged into a random copolymer. The random copolymer comprises at least one monomer with at least one epoxy group and at least one different monomer which is of vinyl monomer type.

24 Claims, No Drawings

POLYMER OPTICAL GUIDE MADE FROM A MONOMER WITH AT LEAST ONE EPOXY GROUP AND A VINYL TYPE MONOMER

TECHNICAL FIELD

The present invention relates to a device for guiding and distributing, gathering and dispersing light, made from different monomers arranged as a random copolymer. The invention may be used in other mechanical and optical devices requiring high stability of shape and dimension at elevated temperatures.

STATE OF THE ART

There is today a number of known materials and technologies for making polymer light waveguides and polymer fibres, see e.g. A. Hornak, ed., "Polymers for light-wave and integrated optics", Marcel Dekker, New York, 1992.

The perhaps most common method of fabricating polymer waveguides is UV-illumination and chemical modification of those parts of a film which are to become lightguides via a photographic mask and subsequent etching of the remaining parts by a solvent. The photographic mask is usually a sheet of quartz glass comprising a chrome layer, wherein holes in the chrome layer constitute a waveguide pattern such that a waveguide material to be can be exposed to UV-light (or some other kind of radiation).

Light waveguides, usually glass fibre, are mostly used in long-distance optical telecommunication.

For short distance (<100 cm) within electronic hardware, polymer light waveguide technology has a potential for lower cost than corresponding glass and plastic fibre alternatives. This is particularly true where several connections are required and where the waveguide pattern is complex, e.g. including y-joints. Optical components such as couplers (e.g. a 1:8 splitter or combiner), wavelength selective components (WDM-components) and the like are potentially less expensive if polymer waveguide technology is used.

In EP A1 0 446 672 a method is disclosed for manufacturing optical waveguides using polymer materials. The polymer materials mentioned in the invention are "ethylenically unsaturated polymers modified with a cycloaliphatic epoxy acrylate group or groups" or "fully epoxidized bisphenol A-formaldehyde novalac". To these materials a photo initiator and a solvent are added.

The waveguide pattern according to the invention is defined by exposing a core and a cladding of the waveguide to radiation to a different extent so that a difference in level of crosslinking and thereby refractive index are provided between the core and the cladding.

The drawback of the above-mentioned copolymers is that the material attenuation is relatively high, about 0.3 dB/cm at 1300 nm.

DISCLOSURE OF THE INVENTION

One problem with polymer material lightguides is that they attenuate light signals more than do corresponding glass lightguides, particularly at those wavelengths that are of interest in telecommunication (1300 nm, 1550 nm).

Another problem is that commercially available standard fibres cannot as a rule be used for a longer period above 80° C., because they are usually made from acrylic plastic having a glass transition point (sagging point) near 100° C.

Different waveguide applications have different requirements for attenuation, but a general requirement is a maximum attenuation of 0.1 dB/cm at 1300 nm wavelength in order to:

1/ enable optical communication within or between electronic products, e.g. within a magazine, on a printed board via a back plane to and on another printed board, or 2/ enable fabrication of e.g. optical couplers, (splitter components, WDM-components or the like) having negligible optical material attenuation.

Additionally, the refractive index step between the printed lightguide core and the surrounding material needs to be adjustable. In so-called multi mode waveguides, which are optically adapted to multi mode glass fibre, the core should have a refractive index which is about 0.020 greater than the refractive index of the surrounding cladding. In single mode waveguides the corresponding value is about 0.005.

It is a further advantage if the difference between the refractive index of the wave-guide core and the refractive index of a corresponding standard grass fibre core (multi mode or single mode) varies as little as possible in order to reduce the intensity of the reflexes which can occur in interfaces between materials with different refractive indices.

In many applications, large areas need to be printed rationally at low cost and with strict requirements as to the waveguide pattern, i.e. it is effectively required that the photographic mask with the waveguide pattern can be placed in direct contact with a "dry" non-sticky polymer film to be printed (i.e. "contact printing"). Printing with the mask separated from the polymer film, i.e. "proximity printing", is required for materials which are "wet films" before curing.

There is a strong wish that the temperatures required for the manufacturing process are as low as possible, among other things to enable the use of certain low-cost but less temperature-resistant substrates. Waveguide substrates can be stiff printed board substrates such as silicon, FR-4 (glass fibre epoxy) or flexible relatively thin polymer films (flex foils) of polyester, polyimide etc.

The present invention relates to solving the problem mentioned above by a material and process technology fulfilling the complete requirements for:

1/ low attenuation (<0.1 dB/cm at 1300 nm) measured with dispersed light,

2/ direct pattern printability in solid state, i.e. with the photographic mask in direct contact with the polymer film to be printed (negative photoresist), 3/ low process temperature (<130° C.), to enable the use of substrates with limited temperature stability, and 4/ adjustable refractive index, i.e. copolymers can be produced for single mode waveguides and for multi mode waveguides.

The present invention constitutes a new group of random copolymers of different monomers wherein said monomers and the proportions between them provide a possibility to tailor-make application-dependent properties, such as optical attenuation (transparency), refractive index, thermal stability and mechanical properties and wherein the set of requirements according to points 1–4 above are fulfilled.

The copolymers which can be used in optical waveguides have molecular weights before crosslinking which are about Mn 15,000 to about Mn 70,000 (Mn denoting number average), which makes them solid materials which, when solved in a suitable solvent, can be applied as thin films on a substrate, using e.g. a spinner or a slit applicator. The film thickness after drying is typically 1–50 μm, depending on, for instance, the solution viscosity, dryness and method of application.

The copolymers that can be used in other shape-permanent and relatively high temperature-resistant plastic components, have molecular weights before crosslinking which are about Mn 15,000 to Mn 5,000,000. These components can, for instance, be made by injection moulding, extrusion, embossing and other methods for thermoplastic machining, after which crosslinking into shape-permanent components (shape-permanent CD discs, optical lenses of, for instance, fresnell, bulk or gradient index type, optical mirrors and mechanical control elements on substrates) can occur.

Materials

One group A of monomers substantially provides low optical attenuation and can be used in the waveguide core and the waveguide cladding together with at least one monomer type B enabling chemical crosslinking. Type A monomers can, for instance, be 2,3,4,5,6-pentafluorostyrene,
2,3,4,5,6-pentachlorostyrene,
2,3,4,5,6-pentabromostyrene,
2,3,4,5,6-pentafluorophenyl meta acrylate,
2,3,4,5,6-pentafluorophenyl acrylate,
2.3.4.5.6-pentachlorophenyl acrylate,
2,3,4,5,6-pentachlorophenyl meta acrylate,
2,3,4,5,6-pentabromophenyl acrylate,
2,3,4,5,6-pentabromophenyl meta acrylate,
tetrafluoroethyl acrylate,
tetrachloroethyl acrylate,
tetrabromoethyl acrylate,
1,1-dihydroperfluorocyclohexyl methyl meta acrylate,
tertbutyl meta acrylate,
isobutylmatacrylate,
1H,1H-heptafluorobutyl acrylate,
1H,1H-heptafluorobutyl meta acrylate,
1H,1H,7H-dodecafluoroheptyl meta acrylate,
1H,1H,2H,2H-heptadecafluorododecyl acrylate,
1H,1H,4H-hexafluorobutyl acrylate,
1H,1H,4H-hexafluorobutyl meta acrylate,
hexafluoroisopropyl acrylate,
hexafluoroisopropyl meta acrylate,
1H,1H-pentadecafluorooctyl acrylate,
1H,1H-pentadecafluorooctyl meta acrylate,
perfluorocyclohexylmethyl meta acrylate,
2-perfluorooctylethyl meta acrylate,
trifluoroisopropyl meta acrylate,
trietoxysilicol meta acrylate,
2,2,2-trifluoroethyl acrylate.
2,2,2-trifluoroethyl meta acrylate, and corresponding with H-atoms replaced by D-atoms (Deuterium) or other heavier atoms such as F, Cl, Br etc., e.g. perfluorostyrene, or in general of vinyl-monomer-type, $CH_2=CXY$, wherein the hydrogen atoms can also be replaced by F and wherein the X-group can be H, F, Cl, $CH_3$ or $CF_3$, and Y can be, for instance, of phenyl-type, acrylate-type, for instance linear, branched, cyclic groups on the ester-group, ether-type, with H-atoms, or wherein D (Deuterium), F, Cl, Br, OD or another substituent are fully or partly substituted for the H-atoms. Preferably, chemical structures (monomers) with as few H-atoms as possible should be used. How-ever, it may often be the case that complete substitution of e.g. fluorine or deuterium for all hydrogen atoms is not practical and/or economically feasible so that compromises between different properties as well as cost define the "stoichiometry" and choice of monomer.

In manufacturing optical waveguides, 2,2,4,5,6-pentafluorostyrene, "p-FSt" and perfluorostyrene are preferably used as these do not tend to crack as easily as acrylate polymers in connection with coating the upper cladding.

In manufacturing optical fibres, the choice of monomer is mainly a question of properties and cost, since polymers with the above-mentioned monomers do not significantly differ in manufacturing difficulties.

In manufacturing plastic components, the choice of monomer is a balance between price and properties (performance).

A monomer group B mainly provides pattern printability through a side group which can be chemically crosslinked and used together with at least one of the type A-monomers. Type B-monomers can, for instance, be:

glycidyl meta acrylate, (2,3, epoxypropyl meta acrylate),
glycidyl acrylate, (2,3, epoxypropyl acrylate), or another monomer with epoxy group and the corresponding with D-atoms (deuterium) or other heavier atoms such as F, Cl, etc. substituting H-atoms to reduce the optical attenuation.

In manufacturing an embedded waveguide with a core and a cladding, at least one monomer from group A-monomers together with at least one monomer from group B-monomers are used for the core. The same goes for the cladding in which the choice of monomer, however, is to provide a suitable refractive index step in reference to the core. For typical multi mode waveguides this refractive index step is about 0.020, the higher index being in the core. For single mode waveguides a typical step is about 0.005 and for polymer fibres about 0.080.

As an alternative to complete freedom of choice of monomers as above, copolymers with the same kinds of monomers A and B can be used both in the core and the cladding. The necessary differences in refractive index between core and cladding are achieved by variation of molar ratios of the monomers therein. One copolymer for the core and another for the cladding can, for instance, be made with only two kinds of monomers (one monomer from group A and another monomer from group B) by variation of the molar ratio of group A-monomer to group B-monomer.

The choice of type A- and B-monomers is also governed by other desired properties, e.g. mechanical properties, thermal properties, environmental properties, processing properties, cost etc.

Photo Initiator

A commercial proton-generating photo initiator, Union Carbide UVI 6974, containing triphenylsulfonium hexafluoroantimone and 4,4(phenyl)phenyldiphenylsulfonium hexafluoroantimone can be used. Another proton-generating photo initiator can also be used.

Special photo initiators can be required for high-fluoridized polymer systems. Photo initiators with a structure and a fluorine content similar to the polymer are preferable. The photo initiator can also be arranged as a side group on the copolymer main chain.

Crosslinking Initiator for the Epoxy Group

Chemical compounds with easily abstracted hydrogen can be used to cleave the epoxy group and enable crosslinking after fibre formation. For instance, gaseous ammonia, $NH_3$, alternatively in solution, or amine compounds can be used.

One advantage of the present invention is that it is relatively temperature-stable, it can withstand short term exposure up to 300° C. and it can withstand relatively long-term exposure at temperatures above 120° C.

A further advantage is that different chemical compounds can be used to cleave the copolymer. For instance, gaseous ammonia, $NH_3$, alternatively in solution, amine compounds, acids or Lewis-acids such as BF3 and its complex compounds can be used. The initiating group can be anion, anionic radical, cation or cationic radical.

Yet a further advantage of the present invention is that there is a possibility to tailor-make application-dependent properties such as optical attenuation (transparency), refractive index, thermal stability and mechanical properties.

Yet an advantage of the present invention is that the requirements 1–4 as above can be fulfilled simultaneously, more simply and in a better manner than according to prior art technologies.

PREFERRED EMBODIMENTS

Material for Pattern Printable Lower and Upper Cladding in Optical Waveguides

The lower cladding polymer can, for instance, be a copolymer of tertbutyl meta acrylate, "t-ButMA" with glycidyl meta acrylate, "GMA" with a molar ratio of 95:5 to 50:50, preferably 90:10 to 70:30. The molecular weight (number average) can be 5 000–500 000, preferably 15 000–50 000. The level of photo initiator can be 0.3–15%, preferably 0.5–1.5%.

Material for Crosslinkable Cladding in Optical Fibres

The cladding polymer can, for instance, be a copolymer of a group A-monomer with glycidyl meta acrylate "GMA" with a molar ratio of 99:1 to 20:80, preferably 95:5 to 60:40. The molecular weight (number average) can be 15 000–5 000 000, preferably 100 000–1 000 000.

Material for Pattern Printable Optical Waveguide Core

The core polymer can, for instance, be a copolymer of pentafluorostyrene "p-f-St" with glycidyl meta acrylate "GMA" with a molar ratio of 95:5 to 20:80, preferably 90:10 to 50:50. The molecular weight (number average) can be 5 000–500 000, preferably 15 000–50 000. The level of photo initiator can be 0.2–15%, preferably 0.5–1.5%.

Material for Pattern Printable Optical Fibre Core

The core polymer can, for instance, be a copolymer of methyl meta acrylate "MMA" with glycidyl meta acrylate "GMA" with a molar ratio of 99:1 to 20:80, preferably 95:5 to 75:25. The molecular weight (number average) can be 15 000–5 000 000, preferably 100 000–1 000 000.

The level of photo initiator, if any, can be 0.2–1.5%.

Polymer Solutions

Suitable solvents for polymer and photo initiators can be chosen according to principles known from: A. F. Barton "Handbook of solubility parameters and other cohesion parameters", CRC Press Boca Raton Ann Arbor, Boston, London 1991.

In manufacturing optical waveguides the respective materials are dissolved together with photo initiator in a suitable solvent. The solvent shall not affect the polymer, the photo initiator or the substrate in a negative manner. It must be possible to evaporate the solvent off the polymer film reasonably quickly at moderately increased temperature. A suitable solvent can be e.g. cyclohexanon. The level of polymer can be within the interval 10–70 % weight to provide layer thicknesses of 1–5 µm or thicker with a spinner at 500–5 000 rpm or with another applicator.

In manufacturing optical fibres and optical waveguides a photo initiator can be added or not, depending on the way of process. The level of photo initiator, if any, can be 0.2–15%, preferably 0.5–1.5%.

Process Examples for Producing Embedded Light Waveguides

Step 1, bottom cladding on substrate:

A cladding polymer solution is distributed into an even layer onto an arbitrary substrate, e.g. silicon, glass epoxy laminate, polyimide film, metal etc., with a spinner or another applicator, after which the polymer film is exposed to a baking process at increased temperature, typically about 100° C., for one to a few minutes, with the object of evaporating the solvent so that a dry, typically 1–50 µm thick polymer film is created. Thereafter, the entire film is exposed to UV-light to produce an acid of the photo initiator that subsequently contributes to crosslinking the epoxy groups. The UV-lamp can, for instance, be Hg-type or Hg-Xe-type. The UV-dose is typically 100–1 000 mJ/cm$^2$. After UV-illumination a baking process occurs, about 30 minutes at about 130° C. to facilitate crosslinking reactions.

Thermal curing and radiation crosslinking (at wave lengths different from UV) can also be used, sometimes without initiator such as in, for instance, electron beam curing.

Step 2, waveguide core on a bottom cladding:

A layer of a core polymer is applied (having a higher refractive index than the cladding polymer), after which the core polymer film is exposed to a baking process at increased temperature, typically at about 100° C., for some minute(s) for the purpose of evaporating the solvent so that a dry, typically 1–50 µm thick polymer film is created. Thereafter the film is exposed to UV-light as above through a conventional mask to generate the intended waveguide pattern, wherein the illuminated parts of the film are crosslinked in the same manner as above. After the UV-illumination a baking process as above occurs. After cooling, the pattern is developed in a suitable solvent, e.g. cyclohexanon, by spraying the substrate with solvent or by dipping the substrate with the polymer films into the solvent. A rinsing or purification can then be done using a solvent with a low ability of swelling or dissolving core and cladding polymers.

Step 3, upper cladding on waveguide core and bottom cladding:

The substrate with lower cladding and patterned core is subsequently coated with a layer of cladding polymer to create an embedded waveguide completely surrounded by a cladding. The same procedure as in Step 1 is used.

Example of a Process for Producing Optical Fibres

In a method according to one embodiment, the fibre (copolymer or copolymer with photo initiator) is illuminated with ultraviolette light (UV) in connection with or after formation so that the added photo initiator is activated, after which the fibre can be crosslinked. The crosslinking process is preferably made at increased temperature, near or above the glass transition temperature of the material. Suitable time and temperature values for this process can, for instance, be taken from examinations using Differential Scanning Calometry "DSC" and UV-DSC (DSC with added UV). The crosslinking time (curing) can in principle be adjusted from the order of second (online) to the order of 24 hours (batchwise offline) depending on temperature.

In a method according to another embodiment, the fibre (copolymer or copolymer with photo initiator) is exposed in connection with or after formation to an external crosslinking initiator (curer) which is allowed to diffuse into the optical fibre. The epoxy group is cleaved from the curer so that the "opened" epoxide can react further and create crosslinks. The diffusion process and the subsequent crosslinking process are preferably executed at increased temperature, near or above the glass transition temperature of the material to reduce the time consumption for this process step. Suitable time temperature values for this process can, for instance, be taken from examinations with DSC. Here as well the crosslinking process can be made quickly online or slowly batchwise offline depending on what is technically and economically suitable.

In the two alternative embodiment methods, core and cladding can make use of disclosed material and process technology. Furthermore, the core can be made separately according to disclosed material and process technology, whereas the cladding is added when using conventional technology, well known to the person skilled in the art. This process step can easily be integrated into the making of the fibre core.

In a further embodiment method a thermoplastic gradient index preform is produced which can subsequently be extended into a fibre which can be crosslinked. Initial material is one of the copolymers or copolymers with or without photo initiator as described above. A method of producing such a preform with gradient index is described in great detail in: Yasuhiro Koike, Graded index materials and components, A, Hornak, ed, "Polymers for lightwave and integrated optics", chapter 3, Marcel Dekker, New York 1992.

The invention is naturally not limited to the above described embodiments but can be modified within the scope of the appended claims.

We claim:

1. Device for guiding light, made from a polymer material comprising a photo initiator and different monomers arranged into a random copolymer, wherein a first monomer is glycidyl acrylate, a second monomer is 2,3,4,5,6-pentafluorostyrene and the photo initiator comprises 4,4 (phenyl)phenyldiphenylsulfonium hexafluoroantimonate and/or triphenylsulfonium hexafluoroantimonate.

2. Device according to claim 1, wherein the first monomer is glycidyl meta acrylate.

3. Device according to claim 1, wherein the second monomer is perfluorostyrene.

4. Device according to claim 1, wherein at least one of the hydrogen atoms in at least one of the monomers is replaced by deuterium.

5. Device according to claim 1, wherein at least one of the hydrogen atoms in at least one of the monomers is replaced by a halogen atom.

6. Device according to claim 1, wherein at least one of the hydrogen atoms in at least one of the monomers is replaced by a $CH_3$-molecule.

7. Device according to claim 6, wherein at least one of the hydrogen atoms in at least one of the $CH_3$-molecules is replaced by a halogen atom.

8. Device according to claim 1, wherein at least one of the hydrogen atoms in at least one of the monomers is replaced by a phenyl group.

9. Device according to claim 8, wherein at least one of the hydrogen atoms in at least one of the phenyl groups is replaced by a halogen atom.

10. Device according to claim 1, wherein at least one of the hydrogen atoms in at least one of the monomers is replaced by an acrylate group.

11. Device according to claim 10, wherein at least one of the hydrogen atoms in at least one of the acrylate groups is replaced by a halogen atom.

12. Device according to claim 1, wherein at least one of the hydrogen atoms in at least one of the monomers is replaced by an ether group.

13. Device according to claim 12, wherein at least one of the hydrogen atoms in at least one of the ether groups is replaced by a halogen atom.

14. Device according to claim 1, wherein a core in the device comprises the random copolymer with a first molar ratio between the monomers therein, and a cladding in the device comprises the same random copolymer but with a molar ratio between the monomers therein which differs from the first molar ratio of the core such that the core has a higher refractive index than the cladding.

15. Device according to claim 1, further comprising a core and a cladding comprising different random copolymers, wherein the core has a higher refractive index than the cladding.

16. Device according to claim 1, wherein the device is a waveguide.

17. Device according to claim 1, wherein the device is an optical fibre.

18. Device according to claim 17, wherein the optical fibre comprises a refractive index gradient, the refractive index being greatest in the centre.

19. Device according to claim 18, wherein a crosslink initiator for the epoxy group is ammonia.

20. Device according to claim 19, wherein said ammonia is provided as gaseous ammonia or in a solution.

21. Device according to claim 20, wherein a crosslink initiator for the epoxy group is an amine compound.

22. Device according to claim 21, wherein a crosslink initiator for the epoxy group is an acid.

23. Device according to claim 22, wherein the acid is a Lewis acid.

24. Device according to claim 1, further comprising an optical lens.

* * * * *